Patented Apr. 5, 1949

2,466,038

UNITED STATES PATENT OFFICE 2,466,038

POLYTHENE COMPOSITIONS CONTAINING CALCIUM CARBONATE

Ernest Lewis Midwinter, London, and Raymond Bliss Richards, Northwich, England, assignors to Imperial Chemical Industries Limited, a corporation of Great Britain No Drawing. Application January 8, 1946, Serial No. 639,908. In Great Britain January 11, 1945

3 Claims. (Cl. 260—41)

This invention relates to a thermoplastic composition containing polythene and calcium carbonate, and a method of manufacture thereof, and has as its objects the manufacture of tough products of high softening point.

Polythene is a solid polymer of ethylene which is made by the polymerisation of ethylene at a high pressure and an elevated temperature, if desired in the presence of a catalyst and if desired in presence of a liquid medium such as water and/or an organic liquid. Processes for the manufacture of polythene are described in U. S. Patents 2,153,553, 2,188,465 and 2,342,400. It is known that fillers such as finely comminuted marble or Iceland spar may be incorporated in it, mainly for raising the electrical permittivity without appreciably raising the power factor, or for giving the polythene a white, attractive appearance. In the grades of polythene which have hitherto been available, the incorporation of a finely ground mineral filler has generally lowered the toughness of the polythene. Furthermore, when fillers are added to polymeric materials, the use of the fillers in a finely ground state does not generally lead to an increase in the toughness of the resultant composition.

We have now found that specially fine particles of calcium carbonate can be used to improve the mechanical properties of tough grades of polythene, in particular to raise further both the softening point and the toughness, and also that the mixture obtained is flexible even at 0° C.

According to the present invention, we provide a composition which consists wholly or substantially of an intimate mixture of 1 part of polythene of melt viscosity exceeding 60,000 poises, and 0.1–1.5 parts of finely divided calcium carbonate chiefly of particle size below 1 micron, preferably activated calcium carbonate of particle size below 0.1 micron. We also provide a method of making this composition which comprises masticating the mixture at a temperature of 160°–250° C. for example on heated mixing rolls.

Melt viscosity $\eta$ for the purposes of this invention is given by the equation $$\eta = \frac{64000}{G}$$

where G is the weight of polythene extruded at 190° C. in 10 minutes through a capillary of length 8 mms. and diameter 2.1 mms. under a pressure of 3 kg. per cm.² The melt viscosities of different grades of polythene may vary from less than 1 poise upwards, and the grades now available may have melt viscosities even up to 10,000,000 poises and higher. The present invention is applicable to polythenes of melt viscosity exceeding 60,000 and generally of 100,000–10,000,000 poises. Not only must the polythene be of high melt viscosity, but also the calcium carbonate must be of fine particle size, chiefly below 1 micron, in order to increase the toughness of the polythene. A convenient particle size is at least 90% less than 1 micron and at least 50% less than 0.1 micron. For example, a highly desirable calcium carbonate for this purpose is obtained by the carbonation of a calcium hydroxide slurry containing a small amount of ammonia, by the process described in British Specification 563,111. We prefer to employ calcium carbonate chiefly of particle size below 0.1 micron which has been activated, for example, by treatment with stearic acid.

We may also incorporate in the product if desired small proportions of other fillers, colouring matter, plasticising agents, antioxidants and the like.

The product obtained has a softening point which is always above 95° C., and which is also higher than that of the original polythene, the softening point of the polythene generally being raised about 5° C. by incorporating calcium carbonate in it as described in this invention. The softening point for the purpose of this invention is measured as the temperature at which a flat-ended needle of area 1 sq. mm. under a load of 1 kg. penetrates a 3 mm. specimen to a depth of 1 mm., the temperature being raised at a rate of 50° C. per hour. The incorporation of finely divided calcium carbonate in tough grades of polythene also does not cause the material to lose its flexibility at 0° C., and unlike the known compositions of polythene and filler the product is flexible at 0° C. and below. It also has a toughness exceeding 250 lbs., and exceeding that of the original polythene, generally being about 50 lbs. greater than that of the polythene. Toughness is defined herein by the minimum load on a flat-ended cylindrical rod of diameter 0.25 inch which will cause it to punch a hole in a 0.125 inch thick sheet of the material. The improvements in properties obtained by this invention are of substantial importance in thermoplastic compositions.

The invention is illustrated but not restricted by the following example.

Example 70 parts by weight of a polythene whose melt viscosity is 1,300,000 poises at 190° C., and 30 parts by weight of activated calcium carbonate having a particle size not exceeding 0.1 micron, sold under the registered trade-mark "Winnofil," are mixed on rolls at 170° C. for 30 minutes, and then pressed into a sheet ⅛ inch thick. This sheet is flexible and its toughness as defined above is 370 lbs., compared with a value of 324 lbs. for this grade of polythene alone. The softening point is 107° C., compared with 103° C. for this grade of polythene alone. The sheet is flexible at —40° C. For comparison, a mixture of 70 parts of the same polythene with 30 parts of calcium carbonate of particle size 2–5 microns has a toughness of only 304 lbs. For a further comparison, a mixture of 70 parts of a polythene of melt viscosity 3000 poises at 190° C. and 30 parts of "Winnofil," has a toughness of only 167 lbs., compared with a value of 230 for the polythene itself; and the mixture is not flexible at 0° C. or below.

What we claim is:

1. A composition comprising one part by weight of polyethylene of melt viscosity exceeding 60,000 poises where melt viscosity equals $$\frac{64000}{G}$$

G being the weight of polyethylene extruded at 190° C. in 10 minutes through a capillary 8 mms. in length and 2.1 mms. in diameter under a pressure of 3 kg. per sq. cm., and 0.1–1.5 parts by weight of finely divided calcium carbonate, at least 90% of the particles of said calcium carbonate being less than 1 micron in size.

2. A composition comprising 70 parts by weight of polyethylene of melt viscosity between 100,000 and 10,000,000 poises where melt viscosity equals $$\frac{64000}{G}$$

G being the weight of polyethylene extruded at 190° C. in 10 minutes through a capillary 8 mms. in length and 2.1 mms. in diameter under a pressure of 3 kg. per sq. cm., and 30 parts by weight of finely divided calcium carbonate, at least 50% of the particles of said calcium carbonate being less than 0.1 micron in size.

3. A composition comprising 70 parts by weight of polyethylene of melt viscosity between 100,000 and 10,000,000 poises where melt viscosity equals $$\frac{64000}{G}$$

G being the weight of polyethylene extruded at 190° C. in 10 minutes through a capillary 8 mms. in length and 2.1 mms. in diameter under a pressure of 3 kg. per sq. cm., and 30 parts by weight of finely divided calcium carbonate, at least 50% of the particles of said calcium carbonate being less than 0.1 micron in size.

ERNEST LEWIS MIDWINTER.
RAYMOND BLISS RICHARDS.

REFERENCES CITED

The following references are of record in the file of this patent:

UNITED STATES PATENTS

| Number | Name | Date |
|---|---|---|
| 2,238,681 | Dorough | Apr. 15, 1941 |
| 2,279,762 | Scott et al. | Apr. 14, 1942 |

OTHER REFERENCES

British Plastics, May 1945, pages 208–215 and 228.

British Plastics, March 1945, pages 94–98.

Certificate of Correction

Patent No. 2,466,038. April 5, 1949.

ERNEST LEWIS MIDWINTER ET AL.

It is hereby certified that error appears in the printed specification of the above numbered patent requiring correction as follows:

Column 4, line 9, claim 2, for "50%" read *90%*;

and that the said Letters Patent should be read with this correction therein that the same may conform to the record of the case in the Patent Office.

Signed and sealed this 6th day of September, A. D. 1949.

[SEAL]

THOMAS F. MURPHY,
*Assistant Commissioner of Patents.*